May 27, 1969  W. E. PONEMON  3,446,385
FILAMENT WOUND REINFORCED PRESSURE VESSEL
Filed Aug. 5, 1966

INVENTOR.
WARREN E. PONEMON
BY Sherman H Barber
his Attorney

United States Patent Office 3,446,385
Patented May 27, 1969

3,446,385
FILAMENT WOUND REINFORCED PRESSURE VESSEL
Warren E. Ponemon, Oyster Bay, N.Y., assignor to Koppers Company, Inc., a corporation of Delaware
Continuation-in-part of application Ser. No. 403,975, Oct. 15, 1964. This application Aug. 5, 1966, Ser. No. 570,588
Int. Cl. B65d 7/42
U.S. Cl. 220—3
2 Claims

ABSTRACT OF THE DISCLOSURE

The pressure vessel of the invention has a corrugated metal inner wall, a fiber glass reinforced outer wall wound upon the inner wall, and a resilient and noncompressible material filling the valleys or troughs of the corrugations in the inner wall and lying between the inner metallic wall and the outer fiber glass wall. The corrugations are of definite depth and, accordingly, permit the inner wall to expand to a great extent without reaching its elastic limit despite its higher modulus of elasticity.

---

This invention relates to pressure vessels and, more particularly, to filament wound metal lined pressure vessels, and is a continuation-in-part of my application Ser. No. 403,975 filed Oct. 15, 1964, now abandoned.

Hardesty U.S. Patent 2,988,240 that issued on June 13, 1961, discloses a fiber glass wound pressure vessel 10 having a metallic inner wall 11 in which there are slight corrugations 12. Hardesty discloses that these corrugations 12 are, in most instances, of very small amplitude so as to be practically imperceptible. It is further disclosed that an outer plastic wall 13 comprised of resin coated filaments 15 is wound over the corrugated inner wall in such a way that the filament reinforcing material 15 bridges over the valleys between adjacent peaks 23. Hardesty states that during the curing of the resin, the internal pressure in the vessel 10 expands the inner metallic liner 11 to such an extent that the corrugations which had been almost imperceptible disappear and the outer wall 13 is actually bonded to the smooth inner metallic wall. Accordingly, Hardesty feels that the resin carried by the filaments completely fills the valleys, if there be any, and the outer wall is completely bonded to the inner wall 11 over its entire surface.

Thereafter, when the internal pressure is relieved, the inner wall 11 tends to resume its normal corrugated shape, but the inner wall 11 cannot do so because it is bonded to the outer wall. Thus, the outer wall is in a prestressed condition that is recognized by Hardesty.

Normally, the filament material in the outer wall of a wound pressure vessel has a lower modulus of elasticity than the metal of the inner wall, which means that the outer wall filament material expands or elongates within its elastic limit much more so than the inner wall metal that has the higher modulus of elasticity. Thus, when the outer wall of such a pressure vessel is stressed to its elastic limit, the inner metal wall will be stressed considerably beyond its elastic limit and, therefore, is permanently deformed.

It is generally desirable to load a pressure vessel to a maximum safe pressure. If the elastic limit of the metal inner wall be chosen as the design criterion, then the outer fiber glass reinforced wall will not assume its fair share of the load, and full advantage will not be taken of the physical characteristics of the outer wall material. If the elastic limit of the outer wall be taken as the design criterion, the inner wall will be permanently deformed before the outer wall assumes its design load.

In accordance with this invention, there is provided a pressure vessel that can effectively make use of the combined strengths of the inner wall material and the outer wall material.

In accordance with this invention, the pressure vessel has a corrugated metal inner wall, a fiber glass reinforced outer wall wound upon the inner wall, and a resilient and noncompressible material filling the valleys or troughs of the corrugations in the inner wall and lying between the inner metallic wall and the outer fiber glass wall. The corrugations are of definite depth and, accordingly, permit the inner wall to expand to a great extent without reaching its elastic limit despite its higher modulus of elasticity. The resilient filler material transmits a fair share of the stress to the outer wall which then expands or elongates up to its elastic limit and thereafter both inner and outer wall material may be stressed up to their respective elastic limits.

For a further understanding of the present invention and for advantages and features thereof, reference may be made to the following description in conjunction with the accompanying drawing which shows for the purpose of exemplification a preferred embodiment of the invention.

In the drawing:

FIG. 6 is a plan view of the arrangement of corrugations shown perspectively in FIG. 6a.

Figure 1:
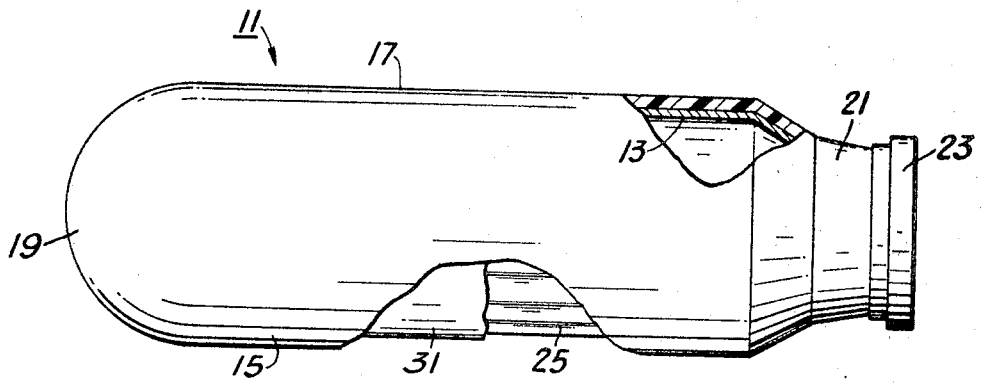
FIG. 1 is a schematic showing of a typical pressure vessel, partly in section, constructed in accordance with the preferred embodiment of the invention.

Referring to FIG. 1, a typical pressure vessel 11 constructed in accordance with the invention has a relatively thin definitively corrugated metal inner wall 13, a resin impregnated glass fiber reinforced outer wall 15 that is wound upon the inner metal wall 13 and a filler material 31 between these walls. The vessel 11 has a generally cylindrical main body portion 17, a hemispherical closure 19 at one end and a tapered open throat and neck portion 21 at the other end which is fitted with a threaded end adapter 23 for receiving a conventional plug-type closure (not shown) or other suitable pressure type closure.

The metallic inner wall 13 may be made of a suitable metal such as aluminum and aluminum alloys, copper and copper alloys, corrosion resistant steels, and special alloy steels that have particularly desirable high strength characteristics. The corrugated pattern of the inner wall 13 may, of course, be formed in any suitable manner such as by using the well-known explosive forming technique.

Figures 2A, 2B, 8:
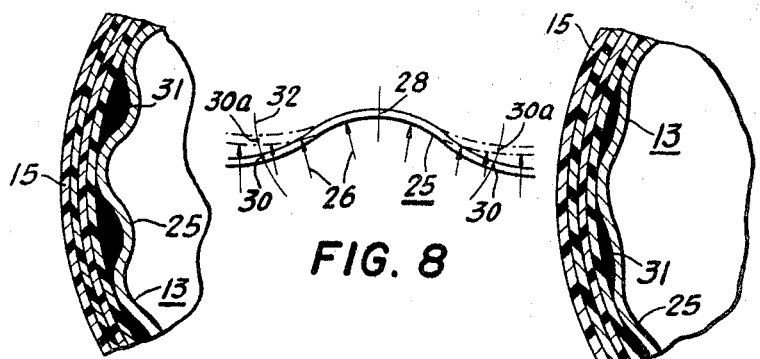
FIGS. 2a and 2b are typical partial sectional views of the vessel of FIG. 1 showing the structure thereof under different stress conditions.
FIG. 8 is a schematic showing of a portion of the corrugated metallic inner wall subjected to internal pressure.
Figure 3:
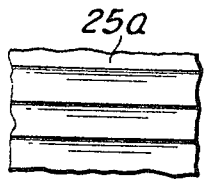
FIGS. 3-5 and 7 illustrate schematically various patterns and arrangements of corrugations in the inner wall of the vessel of FIG. 1.
Figure 4:
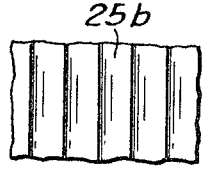
Figure 5:
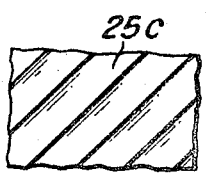
Figure 6:
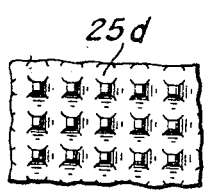
Figure 7:
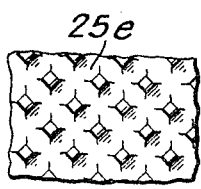
Figure 6A:

The metallic inner wall 13 is corrugated and the corrugations 25 (FIGS. 2a, 2b) may be arranged in any suitable pattern, some of which are illustrated in FIGS. 3-7. For example, the corrugations 25a in the pattern shown in FIG. 3 are arranged with their axes parallel to the longitudinal axis of the pressure vessel 11; the corrugations 25b in the pattern of FIG. 4 are arranged with their axes generally normal to the longitudinal axis of the pressure vessel 11; the corrugations 25c in the pattern of FIG. 5 are generally askew with respect to the longitudinal axis of the pressure vessel 11; in FIGS. 6 and 6a, the pattern of corrugations 25d is a combination of the patterns of FIGS. 3 and 4, that is there are two systems of corrugations which intermerge. One system, having crests that lie on parallel lines such as 36, and another system, having crests that lie on parallel lines, such as 38, oriented at 90° to the line of crests 36. The two merging systems of corrugations produce a plurality of peaks 40 surrounded by valleys 42, about as indicated in FIGS. 6 and 6a; and in FIG. 7, the pattern of corrugations 25e is the pattern of FIG. 5 combined with another similar diagonal pattern running at right angles generally to the pattern of FIG. 5 which arrangement is similar to that of FIGS. 6 and 6a. The corrugations 25 in each pattern have an appreciable depth measured from crest to trough.

Since the physical properties of the metallic inner wall are quite different from the physical properties of the filament reinforced outer wall, especially with respect to their respective moduli of elasticity and their respective elongations, it is desirable to so form the metallic liner in such a manner that it can expand or elongate cooperatively wtih the more expansive outer wall and yet not be stressed beyond its elastic limit and thus be permanently deformed. A corrugated inner metallic wall 13 is one form that allows the inner wall to expand cooperatively with a filament wound outer wall to an extent that the inner wall is not stressed beyond its elastic limit and is not permanently deformed.

FIG. 8 illustrates schematically a portion of the corrugated metallic inner wall 13; the solid outline being the form under no-load condition and the dotted outline being the form resulting from internal pressure forces 26 acting on the corrugation. It will be noticed by those skilled in the art that, assuming a nodal point 28 at the crest of the corrugation, the metallic inner wall elongates as the corrugations tend to flatten. That is, a typical point 30 in the non-stressed inner wall tends to move along an arc 32 to a point 30a in the stressed outer wall. The stresses in the corrugated metallic inner wall, however, are principally flexural stresses; the flexure occuring about the assumed nodal point 28.

Thus, a corrugated metallic inner wall can expand or elongate under internal forces producing stresses within its elastic limit cooperatively with a filament reinforced outer wall wound thereon that expands or elongates to a much greater extent under the same internal forces which produce stresses in the outer wall that are within its elastic limit.

The outer wall 15 is comprised of a plurality of layers of resin impregnated glass fiber rovings that are wound helically on the inner wall in a conventional manner; the inner wall being rotated about its longitudinal axis and a feeding eye, through which the resin impregnated glass fiber rovings pass, being reciprocated to and fro in the general direction of the longitudinal axis of the rotating inner wall, to wind the fiber glass rovings on the mandrel.

The helical winding angle of the rovings determines generally the desired pattern of the corrugations 25 in the inner wall. It is known that winding filaments at a helical angle of 54°45' within a tolerance of 1 degree produces an elongation in the glass fibers that is oriented in only one direction. That is, of the winding helical angle is greater than 54°45', the elongation of the glass fibers will be only in the longitudinal direction of the axis of the vessel; whereas, if the helical winding angle is less than 54°45', the elongation of the glass fibers is in the transverse or hoop direction of the vessel.

It is generally desirable that the metal inner wall 13 elongate in the same direction as the outer wall 15. Therefore, if the helical winding angle of the rovings comprising the outer wall is greater than 54°45' and the elongation of the glass fibers is in the longitudinal direction, the corrugations 25 of the inner metal wall should be arranged in the pattern of FIG. 4. That is, the axes of the corrugations 25 are disposed in a transverse direction to the longitudinal axis of the pressure vessel 11.

Likewise, if the helical winding angle of the filaments is less than 54°45' and the elongation of the glass fibers is in the transverse or hoop direction, the corrugation 25 of the inner wall 13 should be arranged in the pattern of FIG. 3. That is, the axes of the corrugations are disposed parallel to the direction of the longitudinal axis of the pressure vessel 11.

If the filaments comprising the outer wall 15 are wound on the wall in such a manner that the elongation of the glass fibers is in both the longitudinal and hoop direction, then the corrugations 25 in the inner wall 13 may be arranged as in the pattern shown in FIG. 5. In some particular applications it may be advantageous to arrange the corrugations 25 in the pattern shown in FIG. 6 or 7.

While the foregoing has described the invention in relation to resin impregnated fiber glass, it is not so limited. The material comprising the outer wall may be any suitable material such as metal, or other organic material that is used to reinforce a suitable hardenable resin.

The resin with which the filament material is coated may be any of the conventional binder resins that are known and used in the art. The epoxide type resins are preferred for the hardenable or thermosetting binder resins. A particularly useful epoxide resin is the reaction product of an epihalohydrin and a polyhydric phenol, as exemplified by bisphenol-epichlorhydrin. Suitable epoxide resins include the reaction products of epihalohydrins and a polyhydric alcohol such as ethylene glycol, propylene glycol, trimethylene glycol, and the like. Other equivalent epoxide resins may be known to those skilled in the art and used as well. These resins are hardenable by suitable catalysts and across linking agents such as amines, anhydrides and the like.

Other suitable themosetting resins include polyester resins, in particular the alkyd resins comprising the reaction product of copolymers of polyhydric alcohols and dibasic acids. Typical of the larger number of available polyester resins are the copolymers of phthalic anhydride and a polyhydric alcohol such as ethylene glycol, diethylene glycol, or glycerin, maleic anhydride and the polyhydric alcohol, sebacic acid and a polyhydric alcohol, and diethylene glycol and bis-allyl carbonate. These and equivalent polyester resins are advantageously partially polymerized prior to their incorporation in the plastic composition, and may be modified in the manner known in the art by the admixture therewith of such modifiers, as epoxidized oils and unsaturated fatty acids. If desired, suitable polyester polymerization catalysts well known to the art may also be included in the composition.

Other thermosetting polymers that can be employed in the composition include the acrylic compounds, and the phenol-formaldehyde, furfural-formaldehyde, and resorcinol-formaldehyde resins. Moreover, the thermosetting material need not be in every case what is commonly and rather loosely known as a "resin." For example, substances such as phthalic anhydride and diallyl phthalate may be employed as a thermosetting reactive material in the plastic composition.

Those skilled in the art will recognize that the strength of the outer wall depends to a large degree on the relative proportion of reinforcing material to resin material. In a typical application where glass fibers, having a tensile strength in excess of 200,000 p.s.i., are used to reinforce cured epoxide resin having a tensile strength of only 10,000 p.s.i., it is clear that the epoxide resin content of the cured product, such as the outer wall of the pressure vessel of the invention, should be as low as possible. Yet, there must be sufficient resin present to wet the glass fibers completely. In such an instance, a resin content of about 30 percent would be adequate.

In contrast to a resin coated filament wound pressure vessel having a corrugated metallic inner wall wherein the binder resin fills the corrugations, the present invention utilizes a substances 31 that fills the corrugations and that is resilient and practically non-compressible. Such filler substance deforms when the vessel is subjected to internal pressure and always fills the spaces formed by the corrugations between the inner and outer walls.

A suitable filler substance may be a resin that is cured to the plastic state and that has a durometer rating in the range of 40 to 60. Such a filler substance is:

| | Parts |
|---|---|
| Epon 828 (liquid epoxy resin) | 40 |
| Epon X71 (plasticized epoxy resin) | 60 |
| DTA (diethylene triamine) | 7 |
| Cabosil (colloidal silica thixotropic agent) | 5 |

This resin has little action as an adhesive due to the great amount of plasticized epoxy resin. Thus, the inner wall 13 can move relative to the outer wall 15.

The resin filler substance 31, while in the fluid state, is applied to the metal inner wall to completely fill the corrugations and, thereafter, the inner wall 13 and the resin are heated at 150° F. for 1 hour to cure the resin to a plastic state. Such a resin filler substance has a durometer rating of between 40 and 60 and is a resilient practically noncompressible substance, but it is deformable so that it completely fills the corrugations even when the pressure vessel is under internal pressure and stress. Such a resin filler substance also resists any tendency for the corrugations in the inner wall to flatten out as the inner wall stretches and the peripheral distance between adjacent crests is increased.

Other filler materials, for example butadiene compositions and synthetic rubbers having suitable characteristics of temperature resistance for the particular application, may be used for the resilient filler.

The teachings of the prior art disclose that a pressure vessel, having a corrugated inner wall and a filament reinforced resin outer wall, when pressurized internally during the resin curing process, expands radially outward in a manner compacting the resin and filaments, and the filaments in the outer wall become prestressed. This teaching is in distinct contrast to the present invention wherein no prestressing of the filaments in the outer wall occurs. It is particularly advantageous that there be a minimum of prestressing in view of the known characteristic of resins termed creep or relaxation or cold flow.

When plastic is initially stressed to a given level, as in the prestressing condition mentioned herein, and the resultant strain is maintained for a period of time, a phenomenon known as cold flow or creep sets in, and the prestressing condition gradually decreases in time and may even disappear. When the prestressing condition disappears, the strength of a prestressed vessel is significantly impaired.

Vessels constructed in accordance with the present invention are not usually prestressed. Wherefore, such a vessel will withstand the loads and stresses of service to a much greater degree than a prestressed vessel of the prior art that is subject to the cold flow phenomenon.

In the embodiment of the invention shown in FIG. 1, the corrugations 25 are arranged in the manner shown in FIG. 3; that is, the axes of the corrugations are parallel to the longitudinal axis of the pressure vessel 11. Thus, when the vessel 11 is pressurized internally and the glass fiber reinforced outer wall 15 elongates girth-wise (assuming a helical winding angle somewhat less than 54°45′) the metal inner wall 13 also elongates girth-wise and the corrugations 25 tend to become flatter. The resilient plasticized epoxy filler substance 31, being practically noncompressible, deforms, but always fill the voids between the inner and outer wall formed by the corrugations.

A pressure vessel 11 constructed in accordance with the preferred embodiment of the invention is characterized by a lightweight high strength filament reinforced outer wall that is helically wound on a definitively corrugated thin impervious metal inner wall and a plasticized epoxy substance disposed in and completely filling the voids between the inner and outer walls. The physical characteristics of one wall material thus complements the other wall material and together they form a pressure vessel having the desired strength, weight, and fluid holding characteristics.

When such a vessel is under stress due to internal pressure, the filament reinforced outer wall will expand or elongate in one direction depending upon the helical winding angle of the filaments. Assuming a helical winding angle of 57°45′, then the elongation of the outer wall 15 is entirely longitudinal. In this instance the pattern of the corrugations 25b should be as shown in FIG. 4 so that the elongation of the metallic inner wall 13 resulting from a flattening of the corrugations 25b is in the longitudinal direction. The filler material 31 of course deforms as the corrugations 25b tend to flatten and resist a collapsing of the corrugations. Stresses in the metallic inner wall 13 are transmitted through the filler material 31 to the filaments of the outer wall 15 and the composite wall structure (FIGS. 2a, 2b) acts as a unit to resist the internal pressure forces 26. On the other hand, a resin material that both fills the corrugations and binds the filament reinforcements will not react in the same manner since the characteristics of a binder resin are not suitable for a filler resin.

Thus it is a feature of the present invention that the inner and outer wall structures may each be stressed up to its respective elastic limit when the novel composite wall structure of the present invention is incorporated into a hollow pressure vessel. In such a vessel, the respective inner and outer walls assume substantially equal amounts of the internal pressure load, and consequently such a vessel will have a higher rupture strength than vessels constructed in accordance with prior art teachings.

FIG. 2a is a typical section through the wall of the pressure vessel 11 showing the structure thereof while the vessel is in a normal unpressurized condition. FIG. 2b is the same section through the wall of the vessel 11, showing the structure thereof while the vessel is in the stressed or pressurized condition. It is to be noted that in the pressurized state, the corrugations 25 are slightly flatter than in the unpressurized condition, but that, in both the unpressurized and pressurized state, the corrugations 25 have some appreciable depth and are always present in the inner wall 13. The metallic inner wall 13 never attains a condition where the walls become smooth and the corrugations disappear. This is in contrast to the prior art teaching.

As shown in FIGS. 2a and 2b, the outer wall 15 is wound on the inner wall 13 in such a manner that the innermost layer 27 of windings contacts only the crests 29 of the corrugations 25 thereby creating voids in the troughs or valleys between the inner wall 13 and the outer wall 15. The hereinbefore mentioned filler substance 31 fills these voids completely. In practice, after the corrugations 25 are formed in the inner wall 13, the filler substance 31 is applied to the inner wall to fill the corrugations, partially cured as described hereinbefore, and then the resin coated filaments comprising the outer wall are wound over both the filler substance and the crests of the inner wall 13; there being no voids or spaces between the inner wall 13 and the outer wall 15.

While the foregoing has described an embodiment of the invention wherein the corrugations are arranged in a pattern that is compatible with a helical winding angle wherein the elongation of the fiber glass reinforcing elements is unidirectional, it is to be understood that such an arrangement is a specialized case rather than a generalized situation. Generally, a filament wound pressure vessel elongates in both the hoop and the longitudinal direction, and for this reason, it may be more desirable to arrange the corrugations in accordance with the arrangement shown in FIG. 6 or 7.

While the invention has been described herein with a certain degree of particularity, it is understood that the present disclosure has been made only as an example and that various modifications and changes may be made within the scope of the invention.

What is claimed is:

1. A vessel for containing fluids under pressure and having at least one opening for admitting said fluids, comprising:
   (a) an inner metallic wall having a surface comprised of intermerging systems of corrugations with the crests of a first system being oriented substantially at 90° with respect to crests of a second system;
   (b) a resilient non-compressible substance completely filling the troughs of said corrugations to form a smooth outer surface on said inner wall; and
   (c) an outer wall comprised of layers of filaments wound over said smooth outer surface and coated with heat hardenable resin that is cured, said outer wall intimately contacting said inner wall, with
   (d) said filler substance coacting with said inner and outer walls when said vessel is internally pressurized, and deforming and maintaining said valleys full whereby the tendency for said corrugations flatten is reduced.

2. A vessel for containing fluids under pressure and having at least one opening to admit said fluids, comprising:
   (a) a metallic inner wall having a corrugated surface comprised of at least two intermerging systems of corrugations with the crests of one system being oriented at an angle of substantially 90° with respect to the crest of a second system;
   (b) a non-compressible and resilient filler substance disposed in and filling the troughs of the corrugations thereby producing a smooth outer surface on said inner wall; and
   (c) an outer wall comprised of filaments coated with a resin binder substance wound around the inner wall and being contiguous with the crests of said corrugations and with said filler substance.

References Cited

UNITED STATES PATENTS

| | | | |
|---|---|---|---|
| 1,651,521 | 12/1927 | Girardville | 220—3 |
| 2,507,778 | 5/1950 | Frey | 220—71 |
| 2,568,848 | 9/1951 | Enabnit. | |
| 2,614,058 | 10/1952 | Francis. | |
| 2,809,762 | 10/1957 | Cardona | 220—3 |
| 2,827,195 | 3/1958 | Kearns | 220—71 X |
| 2,848,133 | 8/1958 | Ramberg | 220—3 |
| 2,988,240 | 6/1961 | Hardesty | 220—3 |
| 3,132,761 | 5/1964 | Sylvester | 220—3 |

RAPHAEL H. SCHWARTZ, *Primary Examiner.*

U.S. Cl. X.R.

220—72